United States Patent

[11] 3,534,705

| [72] | Inventor | Knut Lennart Nordstrom, Nya Tanneforsyagen 55B, 582 52 Linkoping, Sweden |
|---|---|---|
| [21] | Appl. No. | 792,989 |
| [22] | Filed | Jan. 22, 1969 |
| [45] | Patented | Oct. 20, 1970 |
| [32] | Priority | Feb. 6, 1968 |
| [33] | | Sweden |
| [31] | | 1,508/68 |

[54] MOTOR VEHICLE SPEED DISPLAY DEVICE
5 Claims, 6 Drawing Figs.

| [52] | U.S. Cl. | 116/116 |
|---|---|---|
| [51] | Int. Cl. | G01p 1/06 |
| [50] | Field of Search | 116/116, 129, 56, 57; 73/488, 507, 514; 340/(Consulted) |

[56] References Cited
UNITED STATES PATENTS

| 996,966 | 7/1911 | Bothe et al. | 116/57 |
| 1,135,486 | 4/1915 | Allemann | 116/116 |
| 1,272,396 | 7/1918 | Dixon | 116/57 |
| 2,538,218 | 1/1951 | Treese | 116/129 |
| 3,180,309 | 4/1965 | Clason | 116/116 |

*Primary Examiner*—Louis J. Capozi
*Attorney*—Ira Milton Jones

ABSTRACT: A symbol display member is so rotated by a conventional speedometer drive unit that at each of certain key speeds (e.g., 10, 30, 50, 70 m.p.h.) a symbol thereon has a predetermined orientation. The symbol is conspicuous, simple and symmetrical about at least one line through the rotational axis of the member, so that its orientation is readily perceptible to peripheral vision. A conventional numerical display member is visible through a central aperture in the symbol display member.

Patented Oct. 20, 1970

INVENTOR
Knut Lennart Nordström
BY Ira Milton Jones
ATTORNEY

Patented Oct. 20, 1970

INVENTOR
*Knut Lennart Nordström*
BY
ATTORNEY

MOTOR VEHICLE SPEED DISPLAY DEVICE

This invention relates to speed indicators for motor vehicles and refers more particularly to a speedometer having speed display means perceptible to peripheral vision for providing an indication of the particular speed, within a range of speeds, that is being maintained by a motor vehicle and also of the trend of any speed change.

The heretofore conventional speedometer has had a numerical display of speed that could not be interpreted with the use of peripheral vision while the driver's visual attention remained fixed upon the road. To read it, the driver had to redirect and refocus his eyes, shifting them from a forward line of sight, in which they were focused upon a zone some distance ahead of the vehicle, to a downward line of sight, focused and converged upon a relatively close point within the vehicle. Frequently the ocular readjustment needed for reading the speedometer also entailed a substantial adaptation to a markedly different level of illumination as between the road outside the vehicle and the speedometer.

Thus in the act of shifting the vision from the road to the speedometer, and again back to the road, every set of muscles that controls the eyes was likely to be called into play.

In driving under speed controlled conditions, as on a freeway or turnpike having both minimum and maximum posted speeds, frequent reference to the speedometer is necessary, and each such reference requires all of the ocular adaptation and readaptation just described. The necessity for shifting visual attention back and forth between the road and the speedometer entails the obvious direct hazard of diversion from the road and traffic; but what is less commonly recognized is the more insidious hazard of fatigue due to the frequent and often very substantial muscular adjustments and readjustments needed in giving even a reasonable amount of attention to the heretofore conventional speedometer.

It has been proposed that a special speed indicator be provided that would give an audible signal or a relatively conspicuous visual signal when a predetermined speed was being exceeded, to eliminate at least a portion of the visual shifting involved in checking the speedometer. These expedients, however, are not very satisfactory. A motorist checks his speedometer to ascertain not only his speed but also the trend of this speed. Thus, when accelerating, he needs to know when he is approaching the maximum allowable speed so that he can decrease his acceleration as he comes up to it. If he is given a signal only when the maximum speed is exceeded, he is again relegated to the speedometer for information about the amount by which he has exceeded the maximum and the rate of deceleration that will bring him back down to the limit without causing him to drop substantially below it.

With these deficiencies of prior speed indicating devices in mind, it is a general object of the present invention to provide motor vehicle speed indicating means that will be readily perceptible to peripheral vision, so that a motor vehicle operator need not shift his attention from the road in order to obtain speed information, and whereby information is given that is indicative of the particular speed, within a range of speeds, that is being maintained at each moment and also of the amount and trend of any change of speed.

It is a premise of the present invention that a motor vehicle operator will usually know the general range of speeds within which he is traveling, even without reference to a speedometer; that is, he will usually know, without checking the speedometer, whether his speed is in, for example, the 40's, the 50's or the 60's, even though he may not know the exact speed within the 40's, 50's or 60's at which he is traveling.

Upon this premise it is another object of the present invention to provide a speed indicating device having a rotatable display member on which there is delineated a conspicuous symbol, readily perceptible to peripheral vision, which symbol is symmetrical about a line that intersects the axis of rotation of the display member, said display member being driven for rotation at a rate proportional to change in vehicle speed and through a relatively large rotational angle for a relatively small change in speed, so as to afford a display of the exact speed being maintained within a range of speeds.

More particularly it is an object of this invention to provide a speed display apparatus having a rotatable member on which is delineated a conspicuous symbol of such design that the angular orientation thereof is readily ascertainable with peripheral vision, and which rotatable member is so actuated that said symbol is in a predetermined orientation at each of a series of uniform speed increments (e.g. 10, 30, 50 etc. m.p.h.), and has such orientation at other speeds that the angular deviation from said predetermined orientation is proportional to the deviation from one of said speed increments, so that the exact value of the speed being maintained, as well as the speed trend during change of speed, can be known to the driver with the use of his peripheral vision alone.

Another object of this invention is to provide speed display means of the character described which can be connected with the conventional speedometer drive unit and which is well adapted to cooperate with conventional numerical speed display means.

With these observations and objects in mind, the manner in which the invention achieves its purpose will be appreciated from the following description and the accompanying drawings. This disclosure is intended merely to exemplify the invention. The invention is not limited to the particular structure or method disclosed, and changes can be made therein which lie within the scope of the appended claims without departing from the invention.

The drawings illustrate several complete examples of the physical embodiment of the invention constructed according to the best modes so far devised for the practical application of the principles thereof and in which.

Figure 1:
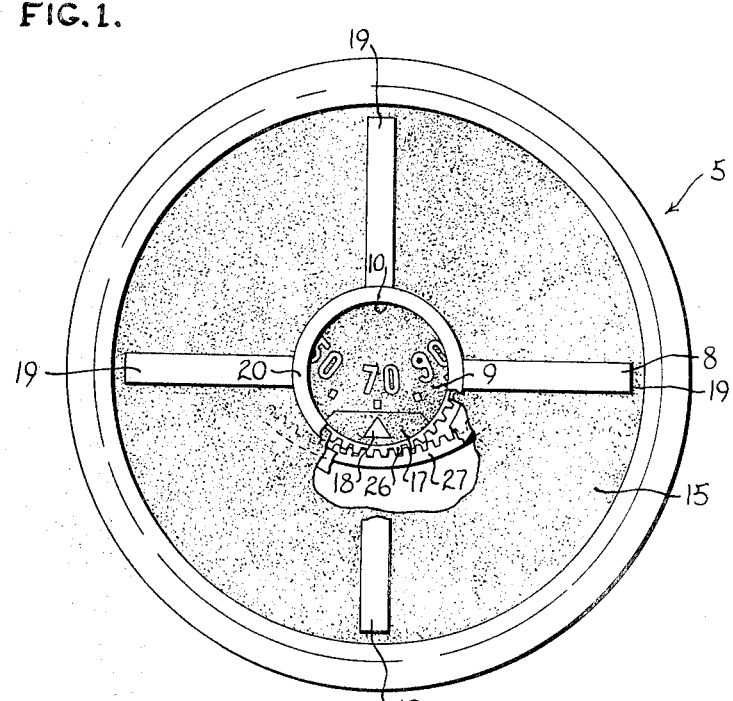
FIG. 1 is a view in front elevation, but with portions broken away, of a motor vehicle speed indicating device embodying the principles of this invention.

Referring now more particularly to the accompanying drawings, the numeral 5 designates generally a speed display device of this invention, which comprises, in general, a housing 6 that encloses a speedometer driving unit 7 of a known type, a symbol display member 8 which is visible through the open front of the housing and which is perceptible to peripheral vision, and a numerical display member 9 which is located behind the symbol display member and is visible through a central aperture 10 in the symbol display member.

The housing 6 can be generally cylindrical, and preferably its open front is closed by a transparent crystal (not shown). The driving unit 7 is mounted in the rear portion of the housing on a bracket 11 that extends diametrically across the housing.

As is conventional, the driving unit is actuated by a flexible input shaft or speedometer cable 12 which extends through the rear wall of the housing and which rotates at a speed proportional to the speed of the vehicle in which the device is mounted. A rotatable output shaft 13 extends forwardly from the driving unit, parallel to the axis of the cylindrical housing and at a distance above the same. A light spiral spring 14 is connected between the bracket 11 and the output shaft 13 to bias the latter in one direction of its rotation. Rotation in the opposite direction is imparted to the output shaft 13 by the driving unit, as a function of vehicle speed.

The numerical display member 9 comprises a disc which is concentrically mounted on the driving unit output shaft 13 to rotate therewith. Numerals are delineated on its front face at uniform circumferential spacings. As shown, the numerals denote multiples of 20 speed units (i.e., 10, 30, 50 etc. m.p.h.

or km/hr.), although it will be understood that any other desired speed intervals could be designated.

Between the numerical display member 9 and the symbol display member 8 there is a stationary disc 15 which extends across the housing and which has a central aperture 16 therein that registers with the aperture 10 in the symbol display member. The stationary disc 15, which can be secured to the bracket 11, provides a strongly contrasting background for the symbol display member 8 and also serves to conceal most of the numerical display disc 9 so that only the portion of the latter that is appropriate to the speed of the vehicle is visible through the circular window defined by the registering apertures 10 and 16. A small stationary bracket 17 extends across the lower portion of the circular window, in front of the numerical display member, and has delineated upon it an index marker 18 that cooperates with the scale on the numerical display member.

The symbol display member 8 is mounted (in a manner described hereinafter) for rotation about an axis which preferably coincides with that of the housing. It is preferably formed to have a rather simple, readily discernible geometric shape. It must be symmetrical about at least one line that passes through its axis of rotation, so that its angular orientation is readily discernible even with peripheral vision, and it is preferably symmetrical to two such lines that are perpendicular to one another and to said rotational axis.

Figure 5:
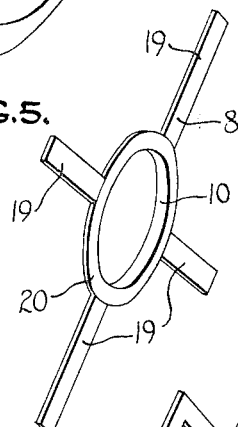
FIG. 5 is a perspective view of the symbol display member of the embodiment of the invention illustrated in FIGS. 1 and 3.

In the embodiment of the invention illustrated in FIGS. 1 and 5, the symbol display member is generally cruciform, having four arms 19 that project at 90° intervals from a central annular portion 20 that defines the aperture 10.

As described hereinafter, the symbol display member 8 has a driving connection with the numerical display member 9, which connection constrains the symbol display member to rotate through a predetermined angle for each increment of speed designated by a pair of adjacent numerals on the numerical display member. Further, the driving connection between the display members is such that the symbol display member has a predetermined orientation at each of a number of selected speed values that are at uniform speed intervals.

For example, the symbol display member 8 can be caused to rotate 90° for each 20 unit speed increment on the numerical display member, and to have one aligned pair of its arms exactly vertical whenever the vehicle speed is exactly 10, 30, 50, 70, etc. In that case all of the arms of the symbol display member would be at 45° to the vertical at the exactly intermediate speeds of 20, 40, 60, etc. Thus the driver would see the symbol display member as a plus sign at 10, 30, 50, etc., and as an X at 20, 40, 60, etc. At speeds above and below those just mentioned, the symbol display member will of course have a correspondingly different angular orientation; that is, its angular deviation from the key orientations will correspond in amount and direction to deviation from the key speeds.

Although the symbol display member presents a speed indication which is equivocal, in that a particular orientation of it can denote any of several different speeds, this fact is of no particular consequence, for the driver will normally have a general idea of the speed range in which he is operating and will therefore have no difficulty in interpreting the display. Because the symbol display member undergoes a relatively large angular displacement for a relatively small change in speed, its display is both readily perceptible to peripheral vision and very easily interpreted. Furthermore, during any change in speed the symbol display member will rotate at a rate and in a direction that are representative of the change in speed, and such rotation, being also readily perceptible to peripheral vision, will aid the driver in achieving and holding the speed that he desires to maintain.

Figure 2:
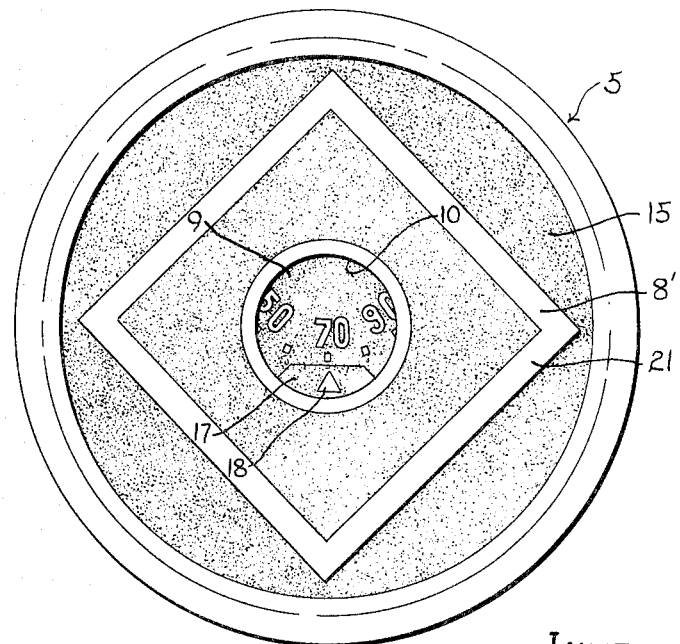
FIG. 2 is a view in front elevation of a modified embodiment of the speed display device of this invention.
Figure 3:
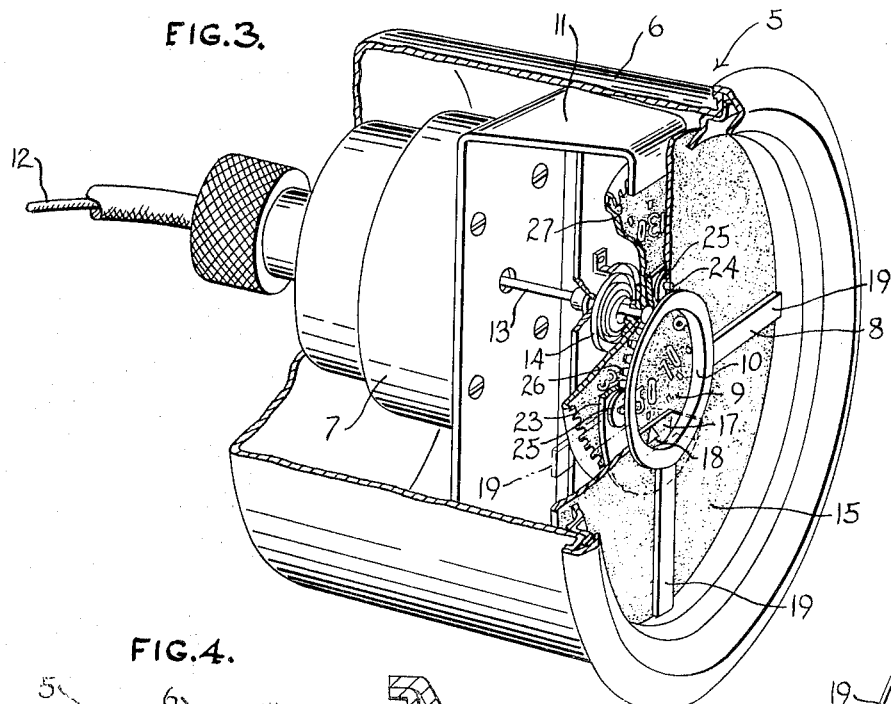
FIG. 3 is a perspective view, with portions cut away, of the device illustrated in FIG. 1.
Figure 4:
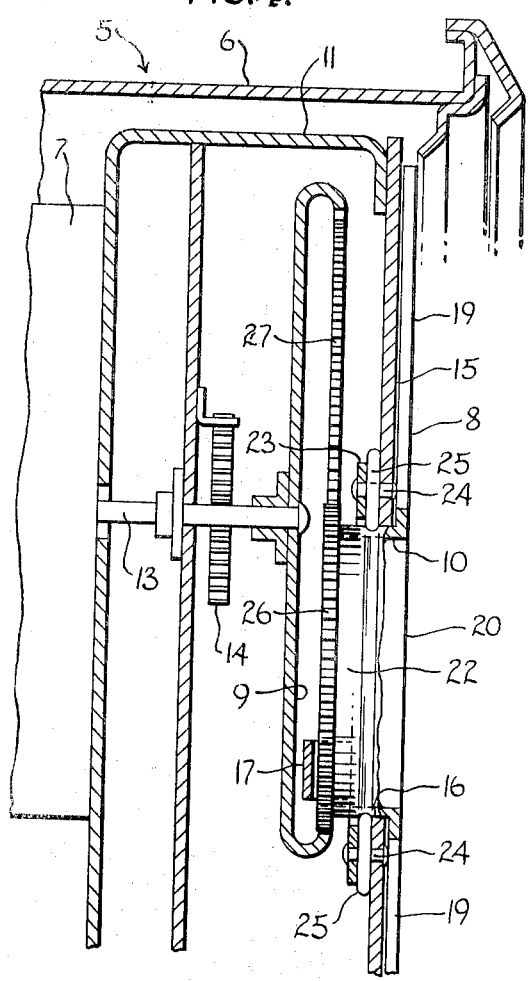
FIG. 4 is a view partly in side elevation and partly in longitudinal section of the display device.
Figure 6:
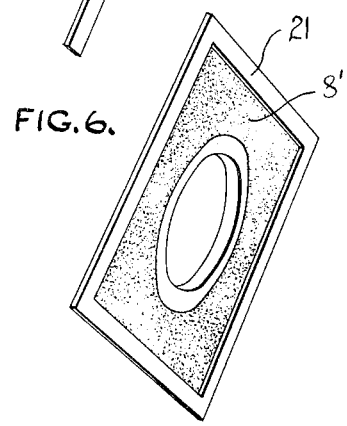
FIG. 6 is a perspective view of the symbol display member of the FIG. 2 embodiment.

In the embodiment of the invention illustrated in FIGS. 2 and 6 the symbol display member 8' is in the form of a square, preferably with a bold and heavy outline 21 suitably delineated thereon and colored to contrast strongly with the remainder of the front surface of the member and with the front face of the stationary disc 15. In this case the lines of symmetry of the symbol can be considered to be those joining opposite corners of the square, and they can be in their horizontal-vertical orientation at appropriate speed increments, as for example 10, 30, 50, etc. speed units per hour.

Other appropriate display symbols can be readily conceived that will meet the criteria of simplicity, high visibility and symmetry about at least one line that intersects the rotational axis of the symbol display member to permit the orientation of said member to be readily perceived with peripheral vision.

It will be observed that the symbol display member, in surrounding the visible portion of the scale on the numerical display member 9, tends to guide the eye to the numerical scale (especially so with the cruciform display member illustrated in FIG. 1), and thus facilitates reference to the numerical scale at such times as it might be consulted.

To mount the symbol display member for rotation, its annular central portion 20 has a hub-like rearward extension 22 in which there is a radially outwardly opening circumferential groove. Spaced a small distance behind the stationary disc 15 and secured thereto is an annular bearing bracket 23 which cooperates with the stationary disc to support fore-and-aft extending pins 24. Roller discs 25 that are journaled on the pins 24 track in the groove just mentioned, to support the symbol display member for rotation.

At its rear the hub-like extension 22 on the symbol display member is flared radially outwardly and formed as radially outwardly projecting gear teeth 26. These mesh with radially inwardly projecting gear teeth 27 formed on a forwardly and radially inwardly turned peripheral flange on the numerical display member 8, to provide a driving connection between the two display members whereby the symbol display member rotates at an appropriate predetermined ratio to rotation of the numerical display member.

It will be appreciated that suitable illumination can be provided for the display members, and that one or both display members can be made of transparent material.

From the foregoing description taken with the accompanying drawings it will be apparent that this invention provides a motor vehicle speed display device that can be observed with peripheral vision to avoid the need for shifting visual attention back and forth between a speedometer and the road, and that the display device greatly facilitates the maintenance of a desired speed by providing readily interpreted data concerning both the speed of the vehicle and the trend of any change in its speed.

I claim:

1. In a motor vehicle speed indicator having a driving unit which so moves in response to changes in vehicle speed as to have a different predetermined position for each speed of the vehicle:
   A. a display member having a face comprising a display symbol that is symmetrical about a line extending across said face;
   B. means mounting the display member for rotation about an axis which is fixed in the speed indicator and which is normal to said face and intersects said line; and
   C. motion transmitting means connecting the driving unit with the display member, for imparting rotation to the display member in consequence of motion of the driving unit, said motion transmitting means being arranged to move the display member at all times that the driving unit is moving and in such proportion to motion of the driving unit that the line of symmetry of the display symbol has a predetermined orientation whenever the speed of the vehicle is at any of a series of predetermined uniform increments of velocity.

2. The motor vehicle speed indicator of claim 1, further characterized by:
   A. a second display member having a movable element and numerical indicia representative of vehicle speeds;
   B. means connecting the driving unit with the second display member; and C. the means connecting the driving unit with one of said display members comprising transmission means connecting said one display member with the other to constrain said one display member to move in a predetermined ratio to movement of said other.

3. The motor vehicle speed indicator of claim 2, further characterized by:
   A. means directly connecting said second display member with the driving unit for rotation of the second display member by the driving unit;
   B. means rotatably mounting the first mentioned display member in front of the second display member;
   C. the first mentioned display member having a central aperture therein through which a portion of the second display member is visible; and
   D. said motion transmitting connection between the display members comprising meshing gear teeth.

4. The motor vehicle speed indicator of claim 3, further characterized by:
   A. a stationary member having an aperture therein;
   B. means mounting the stationary member between said display members with the aperture in the stationary member in register with said central aperture in the first mentioned display member; and
   C. said means mounting the first mentioned display member for rotation being carried by the stationary member.

5. In a motor vehicle speed indicator having a driving unit which moves in response to changes in vehicle speed and has a different predetermined position of its said motion for each vehicle speed:
   A. a display member having a face;
   B. means mounting the display member for rotation about an axis normal to its face;
   C. means on the face of the display member delineating a display symbol which is
      1. symmetrical about a line that intersects said axis and
      2. conspicuous enough to be perceptible to peripheral vision; and
   D. motion transmitting means connected between the driving unit and the display member to constrain the latter at all times to move with the former, said motion transmitting means being so arranged that said line has the same predetermined orientation at each of a plurality of vehicle speeds that differ by uniform amounts.